US008641011B2

(12) United States Patent
Scherer et al.

(10) Patent No.: US 8,641,011 B2
(45) Date of Patent: Feb. 4, 2014

(54) SOLENOID WITH ARMATURE HAVING FRONTAL RECESS

(75) Inventors: Georg J. Scherer, Kirchheim (DE); Helmut J. Mang, Memmingen (DE)

(73) Assignee: SVM Schultz Verwaltungs—GmbH & Co. KG, Memmingen (DE)

( * ) Notice: Subject to any disclaimer, the term of this patent is extended or adjusted under 35 U.S.C. 154(b) by 598 days.

(21) Appl. No.: 12/923,356

(22) Filed: Sep. 16, 2010

(65) Prior Publication Data

US 2011/0062364 A1 Mar. 17, 2011

(30) Foreign Application Priority Data

Sep. 16, 2009 (DE) ......................... 10 2009 041 446

(51) Int. Cl.
*F16K 31/02* (2006.01)

(52) U.S. Cl.
USPC .............. 251/129.17; 251/129.21; 251/335.2; 335/279

(58) Field of Classification Search
USPC .................... 251/129.17, 129.21, 331, 335.2; 335/279
See application file for complete search history.

(56) References Cited

U.S. PATENT DOCUMENTS

| | | | | |
|---|---|---|---|---|
| 3,007,672 A * | 11/1961 | Tischler | ................... | 251/129.21 |
| 3,098,635 A * | 7/1963 | Delaporte et al. | .............. | 251/54 |
| 3,441,246 A * | 4/1969 | Lauppe et al. | ........... | 251/129.17 |
| 3,446,471 A * | 5/1969 | Westphal | ................. | 251/129.17 |
| 3,606,241 A * | 9/1971 | Bornholdt | ................ | 251/129.17 |
| 4,582,294 A * | 4/1986 | Fargo | ....................... | 251/129.15 |
| 4,662,604 A * | 5/1987 | Cook | ....................... | 251/129.17 |
| 4,826,132 A * | 5/1989 | Moldenhauer | ........... | 251/129.17 |
| 4,954,799 A * | 9/1990 | Kumar | ..................... | 251/129.17 |
| 5,226,627 A * | 7/1993 | Hess et al. | ................. | 251/129.2 |
| 5,374,029 A * | 12/1994 | Bailey | ...................... | 251/129.16 |
| 5,546,987 A * | 8/1996 | Sule | ........................... | 137/625.5 |
| 6,644,623 B1 * | 11/2003 | Voss et al. | ................ | 251/129.15 |
| 6,672,562 B2 * | 1/2004 | Kato | ........................ | 251/129.17 |
| 6,941,963 B2 * | 9/2005 | Maula et al. | .................. | 251/331 |
| 2006/0108552 A1 * | 5/2006 | Herbert et al. | ........... | 251/129.17 |
| 2008/0272322 A1 * | 11/2008 | Mayr et al. | ............... | 251/129.15 |

FOREIGN PATENT DOCUMENTS

WO WO 2006/094693 A2 * 9/2006

* cited by examiner

*Primary Examiner* — John Bastianelli
(74) *Attorney, Agent, or Firm* — Jacobson Holman PLLC

(57) ABSTRACT

A solenoid comprises at least one armature supported in an armature space. The armature space is encircled by a coil carrying a number of windings which can be loaded with current. The magnetic field generated by it moves the armature against the core. The armature acts on a pin. The armature has on its front seen in the direction of movement a recess in which a structural part is set. The pin is supported on the structural part.

17 Claims, 2 Drawing Sheets

SOLENOID WITH ARMATURE HAVING FRONTAL RECESS

Figure 1:
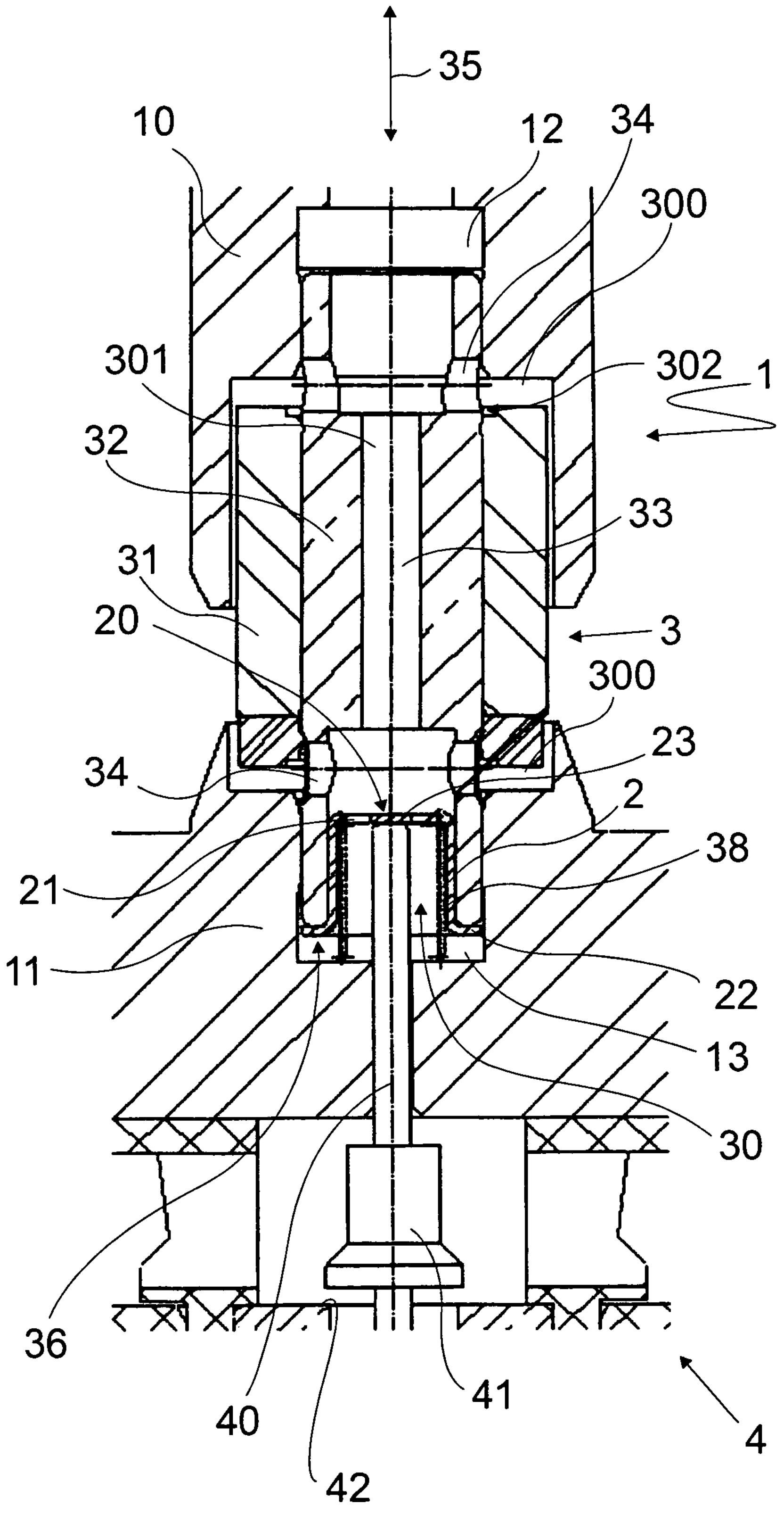

This application has a priority of German no. 10 2009 041 446.0 filed Sep. 16, 2009, hereby incorporated by reference.

The invention refers to a solenoid comprising at least an armature supported in an armature space wherein the armature space is surrounded by a coil carrying a number of windings which can be loaded with current, and the magnetic field generated when electrified moves the armature against a core, wherein the armature acts on a pin, and the armature has a recess on its front seen in the direction of movement.

BACKGROUND OF THE INVENTION

A typical field of application for solenoids are pressure valves, in particular pressure control valves. Here the armature moved by the magnetic field of the solenoid acts on a pin which is part of a control element which in a suitable way adjusts in the valve block a control part against a set of valves and thus controls the pressure.

For a guide of the pin in the armature a recess is provided on its front seen in the direction of movement. This preferably blind hole-like recess receives an end of the pin. The front of the armature is defined here by the direction of movement of the armature when electrified (lifting movement). The front of the armature faces here also the core and the valve block or immerses in it. In particular, the front determines the front side of the armature during the lifting movement. The pin is supported here in the recess in such a way that the lifting movement of the armature, which is, as a rule, a linear movement in axis direction of the armature (and pin), is transferred to the pin.

In pressure control valves with solenoids according to the species the armature space, in order to avoid natural vibrations of the control pressure, is filled completely with oil to reach a hydraulic absorption of the armature movement. For that the armature is provided with longitudinal and transverse borings which makes a defined oil exchange between the different oil spaces possible during the movement of the armature. In the state of the art it is known to produce this boring by machining, wherein in particular in the area of the recess a suitable blind hole boring has to be provided to result in a support of the pin in the armature.

This machining production is a considerable effort with respect to avoiding and removing edges and cleanness which leads to a corresponding expenses for production.

BRIEF ABSTRACT OF THE INVENTION

Coming from this state of the art it is an object of the present invention to suggest a solenoid which can be manufactured easier and therefore more economically.

In order to solve this problem the invention refers to a solenoid as described in the beginning, and suggests that a structural part is put in the recess, and the pin is supported in the structural part.

By means of the suggestion according to the invention the machining production of the blind hole boring and the connected problems are deleted. Often a boring which penetrates the armature axially is enough which requires clearly less effort for finishing. Instead of the shoulder now, according to the invention, a structural part, manufactured for example in a punch-bending operation, is set in which can be produced much cheaper than the machining realization on the armature.

Alternatively it is, according to the invention, provided to manufacture the structural part also as deep-drawn or turned part.

In a preferred modification of the invention it is provided that the outward flanged edge of the structural part is supported on the armature. The armature is often built rotationally symmetric with reference to its longitudinal axis, and carries the structural part as concentrically arranged as possible. The recess is also concentrically integrated in the armature and the structural part manufactured in a punching, die or deep-draw step is designed essentially hat-like, the laterally protruding, wherein the flanged edge is supported on the annular limiting surface of the front terminating the recess. Such a design makes a very simple mounting possible; the structural part can, for example, by way of a certain conical design, simply be inserted in the recess, however, the entire arrangement is equipped with a certain seat or fit in order to guarantee a secure connection of the structural part in the recess.

In a preferred embodiment of the invention it is provided that the armature is formed by an armature body receiving an armature bar, and the structural part is arranged in the armature bar. In particular, for the design of the armature there are several variations in the state of the art. The solution according to the invention comprises all possible solution variations, namely those where the armature is designed in one or even several piece(s). Thus it is possible that the armature comprises only one armature body equipped with the corresponding borings, and has a recess for receiving the structural part. In another modification an armature bar is connected with the armature body, the armature bar with reference to the direction of movement of the armature being longer than the armature body, projecting in particular over it on one or both sides. The armature bar here takes over additional guide tasks as it is guided, for example, in suitable pockets of the core of the solenoid. It is also possible to influence the switching behaviour of the armature accordingly by the multi-piece design by the choice of materials of the armature body and the armature bar. Of course, this multi-piece design is also favourable with respect to the production costs as each of both elements separately can be accordingly optimized.

In a preferred embodiment of the invention it is provided that the armature or the armature bar has an axial penetration opening, if necessary even with different diameters. The axial penetration opening is here parallel or essentially parallel to the direction of movement of the armature and comprises also a recess.

Through the axial penetration opening the interior of the armature is used for filling it with the liquid to be controlled, for example oil, and thus to reach a hydraulic absorption of the armature movement.

Also another embodiment of the invention serves for this purpose according to which on the armature or in the armature body or the armature bar at least one transverse boring is arranged, orientated essentially transversely to the direction of movement of the armature. The transverse boring is arranged here preferably also rectangular, at least transversely (acutely) to the axial penetration opening. Preferably the transverse boring runs in the penetration opening. Besides the possibility of a defined oil exchange between the different oil spaces and thus also an absorption of a movement of the armature, this design also reaches a suitable reduction of mass of the armature and therefore also a quick reaction, switching or control behaviour when the other parameters are the same.

A considerable reduction of costs is reached in particular by the modification according to the invention where the armature, the armature body or the armature bar is designed as section of a pipe profile. It is a characteristic of the pipe profile that it has an axial penetration opening without having been machined. A suitable pipe profile has here sufficient accuracy of its surface area as the surface area carries out corresponding guide and support tasks. By the use of a pipe profile a considerable price advantage is reached as the expensive machining for producing the penetration opening is saved.

An armature bar consisting of a pipe profile is also called armature pipe.

The penetration opening, on the one hand, but also the transverse boring, on the other hand, produces a connection between the interior of the armature and the armature space or the valve block flown through by the hydraulic liquid.

In a preferred design of the invention not only on the front, that is the side facing the valve block, a recess is provided, but also on the backside of the armature opposite the front also a recess is arranged receiving a structural part. The arrangement of a structural part also on the backside of the armature reaches that also on the backside suitable elements are supported and carried in the armature. The design is here chosen in the same way as on the front, the structural part is, if necessary, at least in sections designed conical in order to reach an easier putting in the recess on the backside, the structural part also has an outwardly flanged edge to be supported and carried on the backside of the pipe.

In order to reach a reset of the armature in non-electrified condition a pull-back spring is provided supported in the structural part on the front. During loading the winding of coil with current a magnetic field is generated which moves the armature in front and makes it carry out the desired lifting. The armature is moved here in the direction of the core or valve block, and in the same way also the pin supported in the recess is shifted. This movement is carried out against a pull-back spring which is accordingly flattened or compressed. When now the current is turned off or reduced the pull-back spring relaxes and shifts back the armature against the attraction direction or the direction of lifting, the front moves again away from the core.

In a modification of the invention the structural part is designed pot- or hat-like. The outwardly edged flange of the structural part results in a contact surface of the structural part on the ring-like end surface of the armature. Such a design of the structural part can be produced, for example, in a moulding working step (for example deep-drawing, sinking or stamping) economically.

Cleverly, a thin-walled structural part is provided; the use of a thin-walled structural part saves weight and is favourable for the armature dynamic. A rather thin-walled structural part can also be worked easily.

Advantageously here the material thickness of the structural part is less than 20% of the diameter of the armature or the armature bar, preferably less than 10% of the diameter of the armature or the armature bar, in particular less than 8% of the diameter of the armature or the armature bar.

In a preferred modification of the invention it is provided that on the bottom of the structural part absorption openings are arranged. The bottom of the structural part terminates the recess receiving the pin and/or the pull-back spring towards the rest of the interior of the armature. The arrangement of one or more absorption openings makes it possible that hydraulic liquid can flow through the recess in the interior of the armature. Cleverly, here the absorption openings are integrated in the production step of the structural part, for example by a suitable punching process. The result is here a punch-deforming process, which can be carried out economically. It has been found here that by arranging the absorption borings in a rather thin-walled structural part, as it is also suggested according to the invention, the absorption behaviour improves. A more constant absorption behaviour is reached over the entire range of the operation temperature as the absorption borings can be designed more sharp-edged and shorter (with accordingly thin-walled design of the structural part), and thus have a blind characteristic which only depends in a few ways from the temperature or does not depend on the temperature at all.

For the design of the structural part there is a number of variations for production. One modification as punch-bending part has already been discussed. The result is here that the structural part consists preferably of metal, in particular steel, magnetisable metals or non-magnetisable metals, steels or low-magnetisable metals, steels, light metals or the like. The materials usually known for the construction of magnet parts can be employed here accordingly.

However, the invention is not restricted to these materials, thus it is possible to form the structural part also as injection moulded part, which has the advantage of a corresponding weight reduction. Preferably, then the structural part is formed of, for example, plastic or fiber reinforced plastic (for example with glass fibers or carbon fibers). Of course, it is possible to use accordingly highly resistant or even sufficiently temperature resistant plastics if it is required by the application field of the solenoid or of the pressure valve also comprised by the invention.

Therefore, the invention does not only comprise a solenoid, but refers also to a pressure control valve, in particular comprising a solenoid as described, wherein the pin supported and guided in the recess carries a control part, and the control part interacts with a seal seat of the valve.

Usually in the valve block a corresponding seal seat is provided, and between the valve seat and the control part a gap is formed the size of which is responsible for the valve characteristic, in particular for the pressure reduction. The position of the armature therefore reaches a positioning of the control part with regard to the seal seat, and thus the pressure is controlled.

In the case that the invention is employed, for example, in a hydraulic or even pneumatic valve, it is convenient that the armature space or the interior of the armature or the armature bar is filled with the medium to be controlled.

BRIEF DESCRIPTION OF THE DIFFERENT VIEWS OF THE DRAWINGS

Figure 2:
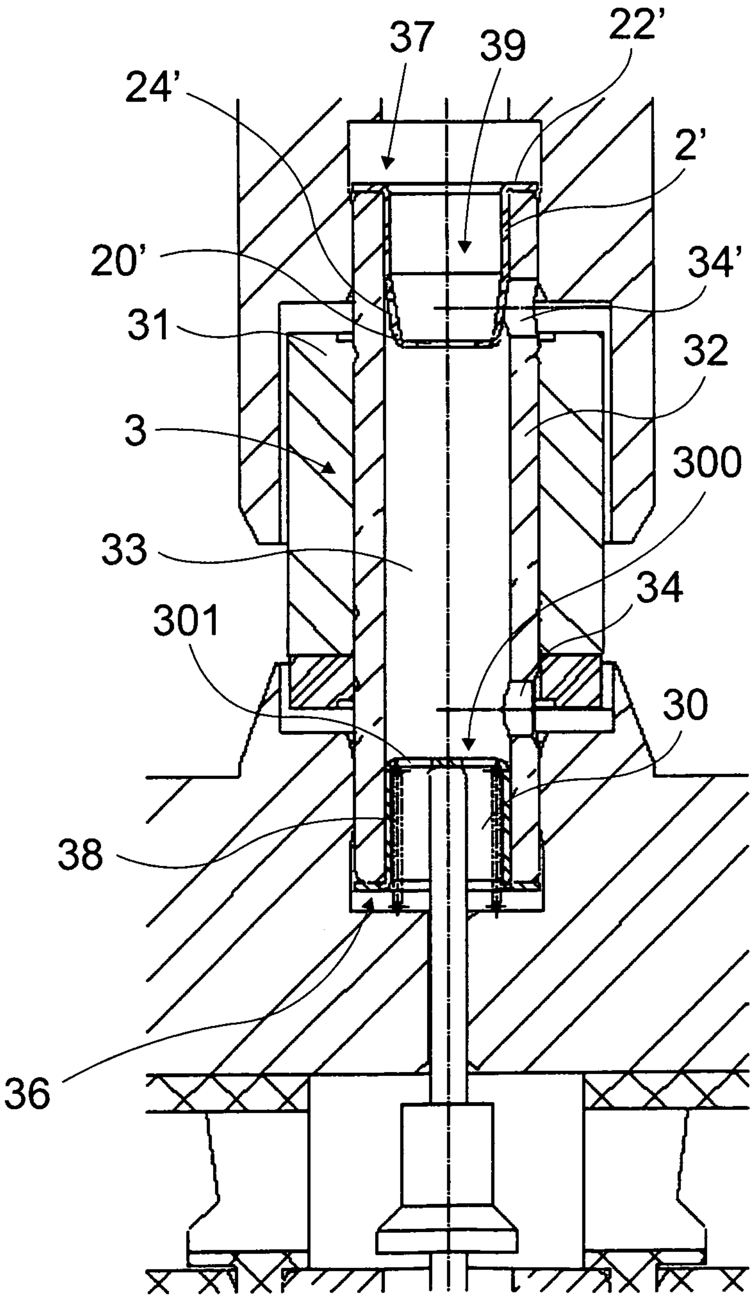

In the drawing the invention is shown schematically in particular in an embodiment. In the drawings:

FIGS. 1, 2 each in a sectional view different modifications of the solenoid according to the invention

DETAILED DESCRIPTION OF THE PREFERRED EMBODIMENT

In the figures identical or corresponding elements each are indicated with the same reference numbers, and are therefore, if not necessary, not described anew.

In the drawing FIG. 1 and FIG. 2 show in two different modifications the solenoid 1 according to the invention. Actually, FIGS. 1 and 2 show the detail essential for the invention of the solenoid 1, wherein in the bottom area the valve block 4 is linked to the solenoid 1.

The solenoid 1 is formed by a coil (not shown) which carries windings and which can be loaded with current, surrounding the armature space 300. In the armature space 300 the armature 3 is supported longitudinally moving (double arrow 35). For a guide of the magnetic field cores 10, 11 are provided, a first core 10 being in the area of the solenoid opposite the valve block 4, a second core 11 being between the armature space 300 and the valve block 4.

When the windings of the coil are loaded with current the armature 3 is drawn downwards against the reset force of the pull-back spring 38 (see double arrow 35), when the current flowing through the windings is reduced or when the current is switched off, the pull-back spring 38 presses the armature 3 upwards against the lifting movement (see double arrow 35).

In the embodiment shown here the armature 3 consists of several parts. An armature body 31 the outer diameter of which corresponds (almost) with the diameter of the armature space 300 has a centrally arranged opening or boring penetrating the armature body 31 in its complete axial length in which the armature bar 32 is set in. The armature body 31 and armature bar 32 are jammed with one another by a mechanic process and thus connected. This jamming is indicated by 302. In this embodiment the armature 3 consists of the armature body 31 and the armature bar 32.

The armature bar 32 has a smaller outer diameter than the armature body 31, however, the armature bar 32 protrudes in the embodiment shown here over the armature body 31 in axial direction on both sides. The cores 10, 11 have here suitable receiving pockets 12, 13 the inner diameter of which is chosen in such a way that the outer surface of the armature bar 32 here results in a guide.

The case of application of the solenoid 1 shown here is the use in a pressure valve, in particular a pressure control valve. The solenoid 1 is therefore an integrated part in such an application and acts on a suitable control element. The control element comprises a control part 41, and interacts because of the position of the armature with a seal seat 42 in order to reach a corresponding control of the course of the pressure.

The control part 41 is arranged on a pin 40. One end of the pin 40 ends in the area of the armature 3. For that in the armature 3 on the front (36) a recess 30 is provided in which the pin 40 projects.

The recess 30 is here, for example, part of a penetration opening penetrating the whole axial length of the armature 3. The penetration opening has, for example, a diameter of 1 mm, if possible also of 0.1 mm to 6 mm or larger, depending on the case of application.

By means of the penetration opening it is reached that the interior 301 of the armature is in connection with the armature space 300, in particular the medium to be controlled can be exchanged between the interior 301 of the armature and the armature space 300. In order to reach an even better exchange between the interior 301 of the armature and the armature space 300, additional transverse borings 34 are provided in the armature bar 32 which are linked on both sides of the armature body 31.

According to the invention here the penetration opening 33 is equipped with a diameter which remains the same or changes, seen in axial direction.

The attraction movement of the armature 3 is directed downwards in the example shown here. This means also the lifting of the solenoid is directed downwards, against the force of the pull-back spring 38. The terminating surface in front in the direction of the lifting is, according to the invention, described as front 36. On this front there is a preferably coaxial recess 30 in which the structural part 2 is set in.

The structural part 2 is designed hat-like, the outwardly flanged edge 22 being supported on the annular terminating surface of the armature 3 on its front 36. The structural part 2 is designed with fit in such a way that it sits properly in the recess 30.

The arrangement is chosen here in such a way that the depth of the structural part 2 is less than the distance of the transverse boring 34 to the front. This prevents the transverse boring 34 from being covered partly or completely by the structural part 2. The structural part 2 is designed essentially hat- or pot-like, and has a bottom 20 equipped with suitable absorption openings 21. The absorption opening 21 is what makes it possible that oil, gas or another medium to be controlled can flow through from the area of the recess 30 in the area of the penetration opening 33, in particular in the interior 301 of the armature, and thus in a suitable way the entire armature space 300 including the armature space 301 is filled with the medium to be controlled.

Of course, the bottom 20 also has a support surface 23 on which the end of the pin 40 is supported. During the lifting movement of the armature 3 (double arrow 35) via the support surface 23 of the structural part 2 this lifting movement is transferred to the pin 40 supported floating in the recess 30, and thus to the control part 41 which is arranged fixedly on the pin 40. The distance of the control part 41 to the seal seat 42 changes accordingly.

In the embodiment shown here the structural part 2 is rather thin-walled, it is only about 4% to 8% of the diameter of the armature bar.

Usually the structural part has a wall thickness of 0.2 to 0.4 mm.

It can be seen clearly that the penetration opening 33 does not penetrate the armature bar 32 with a continuous diameter but the penetration opening 33 expands in the margin area in the area of the recess 30. The transverse boring 34 is here flush with the armature body 31, and defines thus also the area where the expansion of the penetration opening 33 starts. In this area of the expansion there is then the recess 30 in which the structural part 2 is set or pressed in, jammed in or integrated.

In the embodiment shown in FIG. 1 the armature bar 32 has been created, for example, of solid material in which by machining at least the area of the recess 30 (on both sides) and, if necessary, also the axially extending penetration opening 33 has been worked out. Compared to this, FIG. 2 shows another modification. Here also the armature 3 consists of two elements, the armature body 31 and the armature bar 32 with an axially extending penetration opening 33. However, in this example the radius of the penetration opening 33 is constant in axial direction along the armature bar 32, as it is typical, for example, for an armature bar 32 designed as profile. In this case instead of the term armature bar 32 also the term armature pipe could be used. In a modification of embodiment of this type the production costs are even more reduced as no machining is necessary for the armature bar. As already described for FIG. 1, also the modification according to FIG. 2 has a recess 30 on the front 36, by the way, this has the same diameter as the penetration opening 33. In this a structural part 2 with a cylindrical outer surface has been set in. In the embodiment shown here, however, also on the backside 37 opposite the front 36 a recess 39 is provided in which also a structural part 2' is set in. On the front end 24 facing the bottom 20' the structural part 2 is designed conically. In the upper edge 22' starting inwards the design is more cylindrical.

In the second, upper recess 39 on the backside 37 of the armature 3 which is formed by the structural part 2', for example, an adjusting spring (not shown) is provided.

Although the invention has been described by exact examples which are illustrated in the most extensive detail, it is pointed out that this serves only for illustration, and that the invention is not necessarily limited to it because alternative embodiments and methods become clear for experts in view of the disclosure. Accordingly changes can be considered which can be made without departing from the contents of the described invention.

The invention claimed is:

1. A solenoid at least comprising an armature supported in an armature space, wherein the armature space is encircled by a coil carrying a number of windings which can be loaded with current, and the magnetic field generated when electrified moves the armature against a core, wherein the armature acts on a pin, and the armature has on its front seen in the direction of movement a recess, characterized in that a structural part is put in the recess, and the pin is supported in the structural part, wherein the structural part is a hat shape with a laterally protruding flanged edge being supported on an armature limiting surface of the armature's front.

2. The solenoid according to claim 1, characterized in that the armature is formed by an armature body receiving an armature bar, and the structural part is arranged in the armature bar.

3. The solenoid according to claim 1, characterized in that the armature has an axial penetration opening.

4. The solenoid according to claim 1, characterized in that the armature has an armature body and an armature bar, and the armature, the armature body or the armature bar is/are designed as section of a pipe.

5. The solenoid according to claim 1, characterized in that the armature has an armature body and an armature bar, and on the armature body or the armature bar at least one transverse boring is arranged which is orientated essentially transverse to the direction of movement of the armature.

6. The solenoid according to claim 1, characterized in that the armature has a front and a backside, and on the backside of the armature opposite the front in another recess another structural part is arranged.

7. The solenoid according to claim 1, characterized in that the armature has a front and a backside, and on the backside of the armature opposite the front in another recess another structural part is arranged, and a pull-back spring is supported in the another structural part.

8. The solenoid according to claim 1, characterized in that the armature has a front and a backside, and on the backside of the armature opposite the front in another recess another structural part is arranged, and the another structural part is designed pot shape or hat shape.

9. The solenoid according to claim 1, characterized in that the armature has a front and a backside, and the structural part is designed thin-walled.

10. The solenoid according to claim 1, characterized in that the armature has a front and a backside, and on the backside of the armature opposite the front in another recess another structural part is arranged, and on the bottom of the another structural part absorption openings are provided.

11. The solenoid according to claim 1, characterized in that the armature has a front and a backside, and on the backside of the armature opposite the front in another recess another structural part is arranged, and the another structural part is designed as punch-bending part, as deep-drawn part or turned part.

12. The solenoid according to claim 1, characterized in that the armature has a front and a backside, and on the backside of the armature opposite the front in another recess another structural part is arranged, and the another structural part is designed as moulded plastic article.

13. The solenoid according to claim 1, characterized in that the armature has a front and a backside, and on the backside of the armature opposite the front in another recess another structural part is arranged, and the another structural part consists of metal, steel, lightweight metal, plastic or fiber reinforced plastic.

14. A pressure valve comprising a solenoid, at least comprising an armature supported in an armature space, wherein the armature space is encircled by a coil carrying a number of windings which can be loaded with current, and the magnetic field generated when electrified moves the armature against a core, wherein the armature acts on a pin, and the armature has on its front seen in the direction of movement a recess, and a structural part is set in the recess, and the pin is supported in the structural part, wherein the pin carries a control part, and the control part interacts with a seal seat of a valve block, wherein the structural part is a hat shape with a laterally protruding flanged edge being supported on an armature limiting surface of the armature's front.

15. The pressure valve according to claim 14, characterized in that the armature space or the interior of the armature or the armature bar is filled with the medium to be controlled.

16. The solenoid according to claim 1, wherein the axial penetration opening has different diameters.

17. The solenoid according to claim 14, wherein the pressure valve is a pressure control valve.

* * * * *